(12) United States Patent
Occhialini et al.

(10) Patent No.: US 10,454,787 B2
(45) Date of Patent: Oct. 22, 2019

(54) TIMELINE ZOOM AND SERVICE LEVEL AGREEMENT VALIDATION

(71) Applicant: ServiceNow, Inc., Santa Clara, CA (US)

(72) Inventors: Jason Occhialini, Loomis, CA (US); Ryan Currier, Cupertino, CA (US)

(73) Assignee: ServiceNow, Inc., Santa Clara, CA (US)

( * ) Notice: Subject to any disclaimer, the term of this patent is extended or adjusted under 35 U.S.C. 154(b) by 154 days.

(21) Appl. No.: 15/787,396

(22) Filed: Oct. 18, 2017

(65) Prior Publication Data

US 2018/0324056 A1    Nov. 8, 2018

Related U.S. Application Data

(60) Provisional application No. 62/501,643, filed on May 4, 2017.

(51) Int. Cl.
*H04L 12/24* (2006.01)
*G06F 17/30* (2006.01)
(Continued)

(52) U.S. Cl.
CPC ........ *H04L 41/5009* (2013.01); *G06F 3/0485* (2013.01); *G06F 3/04817* (2013.01);
(Continued)

(58) Field of Classification Search
CPC . H04L 41/22; H04L 41/5006; H04L 41/5009; H04L 41/5074; H04L 41/5096;
(Continued)

(56) References Cited

U.S. PATENT DOCUMENTS 9,659,391 B1 *  5/2017  Mitra .................. G06F 3/04817
10,282,254 B1 *  5/2019  Chopra ............... G06F 11/1412
(Continued)

FOREIGN PATENT DOCUMENTS

CA      2689874 A1 *  6/2010  ......... G06Q 30/0251
EP      2189908 A1 *  5/2010  .......... G06F 11/3419
(Continued)

*Primary Examiner* — Kostas J Katsikis
(74) *Attorney, Agent, or Firm* — Fletcher Yoder PC

(57) ABSTRACT

Systems and methods for providing service level agreement (SLA) definition and validation of SLA parameters are disclosed. An SLA may be defined with parameters and goals to achieve desirable business results for information technology (IT) software updates, configuration changes, security incidents, and other functions performed by IT personnel. Once a proposed SLA definition is available and before it is put into production use, historical data may be applied to the SLA. This historical application of data may be used to determine a level of conformance to the proposed SLA based on real world historical information for a particular customer. Because different corporations have different capabilities and expectations, a one-size fits all SLA may not be appropriate. A timeline visualization with zoom capability and state transition icons is disclosed. Disclosed, visualization techniques of proposed definitions may enhance the accuracy and acceptability of those proposed definitions.

16 Claims, 11 Drawing Sheets

(51) Int. Cl.
*G06F 3/0484* (2013.01)
*G06F 3/0481* (2013.01)
*G06F 16/21* (2019.01)
*G06F 3/0485* (2013.01)
*H04L 29/08* (2006.01)

(52) U.S. Cl.
CPC ........ G06F 3/04842 (2013.01); G06F 16/219 (2019.01); H04L 41/5006 (2013.01); H04L 41/5074 (2013.01); *G06F 2203/04806* (2013.01); *H04L 41/22* (2013.01); *H04L 41/5096* (2013.01); H04L 67/10 (2013.01)

(58) Field of Classification Search
CPC ... H04L 67/10; G06F 3/0485; G06F 3/04817; G06F 3/04842; G06F 2203/04806; G06F 16/219
See application file for complete search history.

(56) References Cited

U.S. PATENT DOCUMENTS

| | | | | |
|---|---|---|---|---|
| 2005/0246119 | A1* | 11/2005 | Koodali | H04N 17/04 702/79 |
| 2006/0229931 | A1* | 10/2006 | Fligler | G06Q 10/0639 705/7.38 |
| 2010/0268568 | A1* | 10/2010 | Ochs | G06Q 10/0633 705/7.27 |
| 2014/0229391 | A1* | 8/2014 | East, III | G06Q 10/20 705/305 |
| 2014/0324797 | A1* | 10/2014 | Yung | G06Q 50/01 707/692 |
| 2015/0370877 | A1* | 12/2015 | Bandera | G06F 16/26 715/202 |
| 2015/0379011 | A1* | 12/2015 | Neyyan | G06F 16/489 345/581 |
| 2017/0287180 | A1* | 10/2017 | Mitra | G06F 3/04817 |
| 2018/0041404 | A1* | 2/2018 | Singh | H04L 41/5041 |
| 2018/0314396 | A1* | 11/2018 | Swaminathan | G06F 3/0483 |

FOREIGN PATENT DOCUMENTS

| | | | | |
|---|---|---|---|---|
| KR | 20080050187 | A * | 6/2008 | |
| WO | WO-02060099 | A2 * | 8/2002 | .......... G06Q 10/067 |
| WO | WO-2005008402 | A2 * | 1/2005 | .......... G06Q 10/063 |
| WO | WO-2007092232 | A2 * | 8/2007 | ............. G06Q 10/00 |

\* cited by examiner

TIMELINE ZOOM AND SERVICE LEVEL AGREEMENT VALIDATION

CROSS REFERENCE TO RELATED APPLICATIONS

This application claims priority to U.S. Provisional Application No. 62/501,643 filed May 5, 2017, entitled "Timeline Zoom and Service Level Agreement Validation," by Jason Occhialini, et al. for all purposes, the contents of which are incorporated herein by reference in its entirety.

TECHNICAL FIELD

Embodiments described herein generally relate to cloud computing and in particular to service level agreement (SLA) visualization and possibly validation utilizing historical data. Defining an SLA in conformance with realistic expectations is an important aspect when confronted with setting up incident management, change management, security management, and other business function management aspects of an enterprise's information technology (IT) system. Proper SLA definition and refinement of agreement thresholds over time may result in conformance with contractual obligations and overall optimization of support functions for a business.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, support personnel may be asked to deal with higher expectations of response time to infrastructure issues. The goal of most business systems and cloud computing systems in particular is very high availability. Accordingly, users of business systems have grown accustom to nearly 100% availability of all business functions. One important aspect of maintaining such high availability is conformance with service level agreements (SLAs). SLAs, as the name implies, generally represent an agreement between a service provider (either internal, external, or a combination thereof) and a consumer of a service. The agreement defines the level of service expected from the service provider by that consumer and is typically viewed by the customer as a guarantee of that level of service. For example, when used as a call center metric, service level measures the percentage of incoming calls that are answered live in an established amount of time (e.g., wait time less than 5 minutes for 90% of calls). If an SLA is routinely out of schedule it may mean that the SLA was not properly defined, more resources (e.g., call center operators) are required, or the trouble shooting of an event was not properly managed. The disclosed techniques for SLA definition and visualization address these and other issues.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed below.

In one embodiment, a cloud-based computer system includes a memory partition; a network interface communicatively coupled to one or more processing units and the memory partition, wherein the memory partition comprises computer instructions that when executed by the one or more processing units cause the cloud-based computer system to: provide a hosted client instance communicatively coupled, via the network interface, with a remote client device; receive a request from the remote client device for a timeline display of a plurality of task items, each task item having an associated service level agreement (SLA); obtain information related to a stage of progress for each task item relative to the associated SLA; prepare a timeline display representation for the plurality of task items, each task item in the timeline view having a set of icons indicating a progression through a workflow corresponding to the task item and each timeline having a color coding indicating a state of compliance with the associated SLA for a duration of time within the timeline associated with the task item; and send information regarding the timeline display representation to the remote client device.

In another embodiment, a service level agreement (SLA) validation method, is disclosed. The method includes receiving an indication of historical data associated with a plurality of task items and progression of the plurality of task items through a workflow; receiving an indication of a proposed SLA definition to apply to the historical data; receiving a request for a timeline display associated with the plurality of task items relative to the proposed SLA definition; determining, using the historical data, information related to a stage of progress through the workflow relative to the proposed SLA definition for each of the plurality of task items; preparing a timeline display representation for the plurality of task items, each task item presented as a timeline in the timeline display, the timeline having a set of icons indicating a progression through the workflow corresponding to the task item, the progression through the workflow derived at least in part from the historical data, and the timeline having a color coding indicating a state of compliance with the proposed SLA for a duration of time within the timeline.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
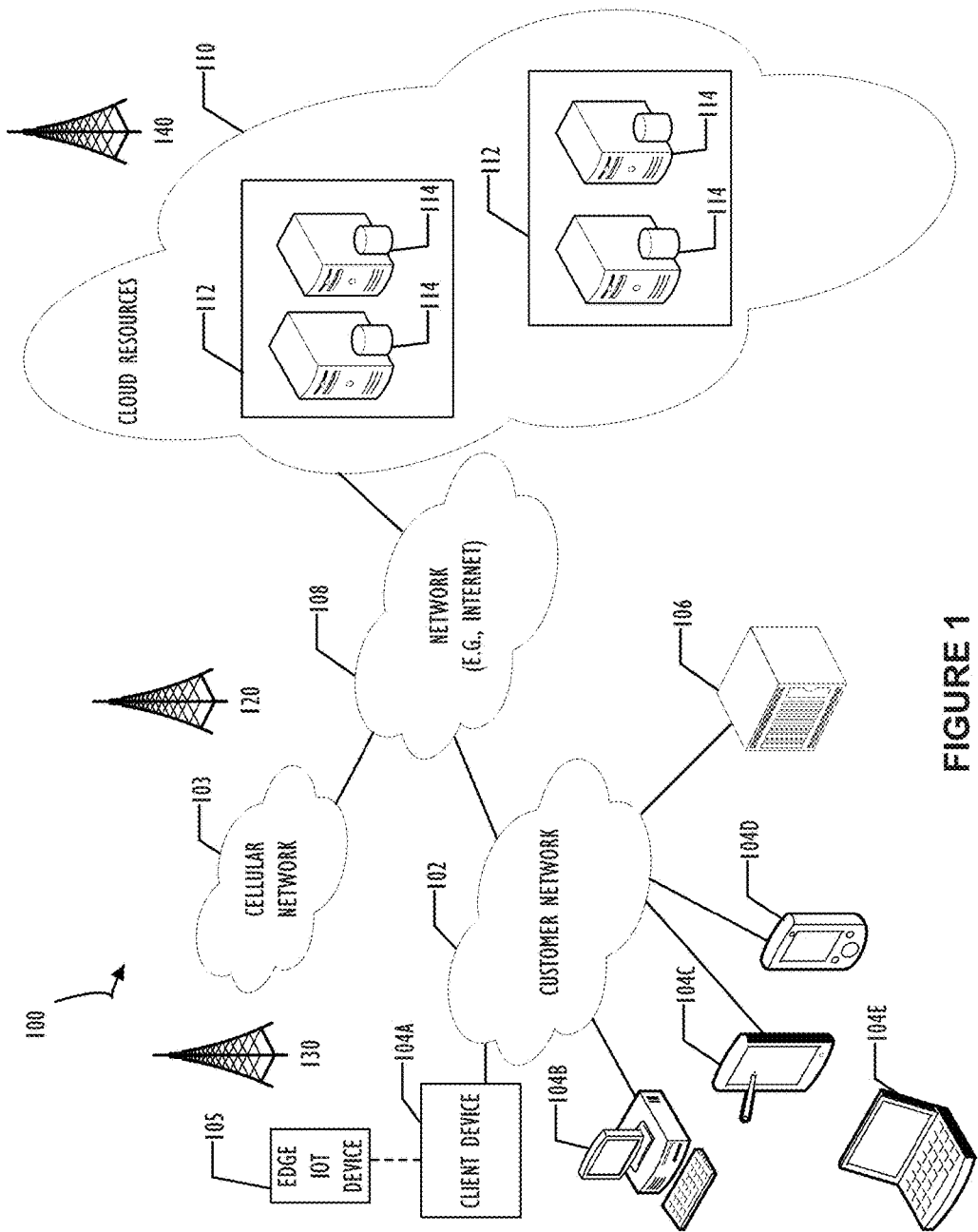
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various example embodiments are disclosed herein that allow end-users to define and view SLA conformance. SLAs may be associated with a service and each service may be broken down into tasks associated with that service. In another example, an SLA may reflect a desired availability of a service and in the event of degradation or failure a timeframe to restore the service to a particular performance level. In the case of degradation or failure, a set of remedial tasks may be initiated to diagnose the problem. Once properly diagnosed, a remedial plan of action may be initiated to correct any incidents contributing to the failure or degradation. Each of these tasks (or steps) may have an allotted amount of time for completion. In the case of an incident report being addressed, that incident may go through a series of state changes (transitions) that can be tracked as a portion of SLA conformance. For example, if a server is detected as being off-line, a support person must acknowledge that they are aware of the situation and in the process of getting the situation addressed within a certain amount of time (e.g., 15 minutes). In this example, if there has not been an acknowledgement within the allotted 15 minutes, an escalation may take place to a secondary support team and a second acknowledgement timer may be set. In this manner, the incident may be repeatedly "escalated" until a response that indicates someone is aware of the problem is received. Further, upon acknowledgement of notification of the problem, a timer may be set for completion of a second step in a resolution process for that server. This process may continue until the server is fixed and the incident report marked closed. More details of SLA processing, definition, and validation are explained below with reference to FIGS. 4-6. More details and examples of visualization are explained with reference to FIGS. 7-10 below.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks (Wi-Fi is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance may be configured with a client side application interface such as, for example, a web browser executing on a client device (e.g., one of client devices 104A-E of FIG. 1). In this example, an end-user may interact with the web browser to define a proposed SLA and an indication of historical data to apply to the proposed SLA. To improve accuracy and acceptability of the proposed SLA, the proposed definition may be applied to matching criteria from the historical data. That is, the portions of the historical data that may be properly associated with the SLA have the proposed SLA definition applied "as if" that SLA had been in place at the time the associated historical data was collected. The user may then use the SLA timeline viewer (See FIGS. 7-10) to obtain and review a pictorial and color coded representation of incidents (or other activities) to which this proposed SLA definition would have applied. Using the color coding and zoom capabilities to investigate portions of non-compliance, the user may be able to refine parameters of the SLA that may not be currently achievable.

In some cases, areas of historical non-compliance may not indicate a current concern because of updates to infrastructure (e.g., staffing or capacity) that are expected to address and correct that non-compliant aspect of the proposed SLA definition. Details of this will be further discussed below with reference to FIGS. 3-6.

Figure 2:
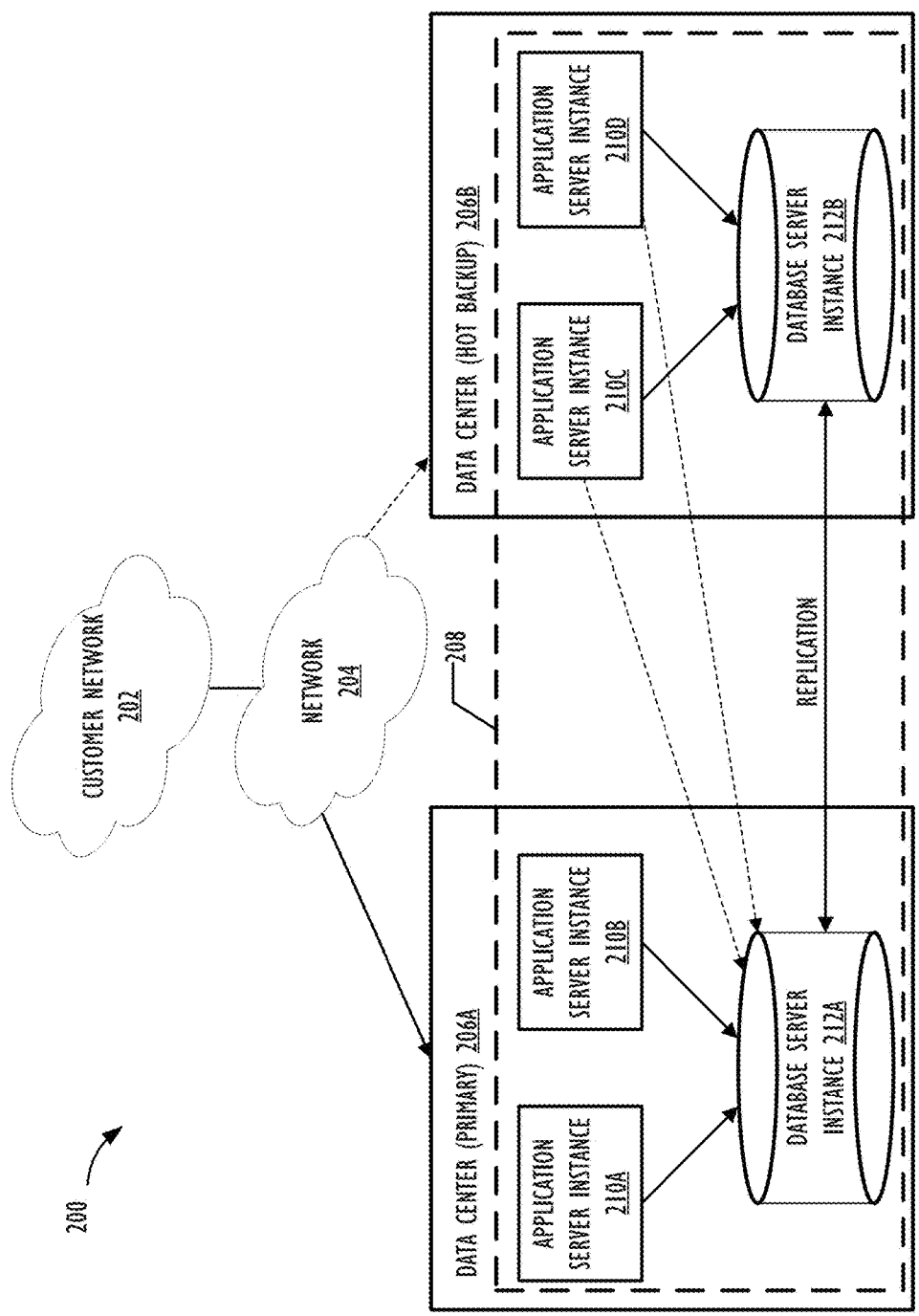
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud resources platform/network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, application server instances 210a-210d and database server instances 212a and 212b are shown to be allocated to two different data centers 206a and 206b, where one of data centers 206 may act as a backup data center in reference to FIG. 2, data center 206a acts as a primary data center that includes a primary pair of application server instances 210a and 210b and primary database server instance 212a for customer instance 208, and data center 206b acts as a secondary data center to back up primary data center 206a for a customer instance 208. To back up primary data center 206a for customer instance 208, secondary data center 206 includes a secondary pair of application server instances 210c and 210d and a secondary database server instance 212b. Primary database server instance 212a is able to replicate data to secondary database server instance 212b. As shown in FIG. 2, primary database server instance 212a replicates data to secondary database server instance 212b using a replication operation such as, for example, a Master-Master MySQL Binlog replication operation. The replication of data between data. centers could be implemented in real time or by implementing full backup weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if application server instances 210a and 210b and/or primary data server instance 212a fails and/or is under maintenance, data traffic for customer instances 208 can be diverted to secondary application server instances 210c and 210d and secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3:
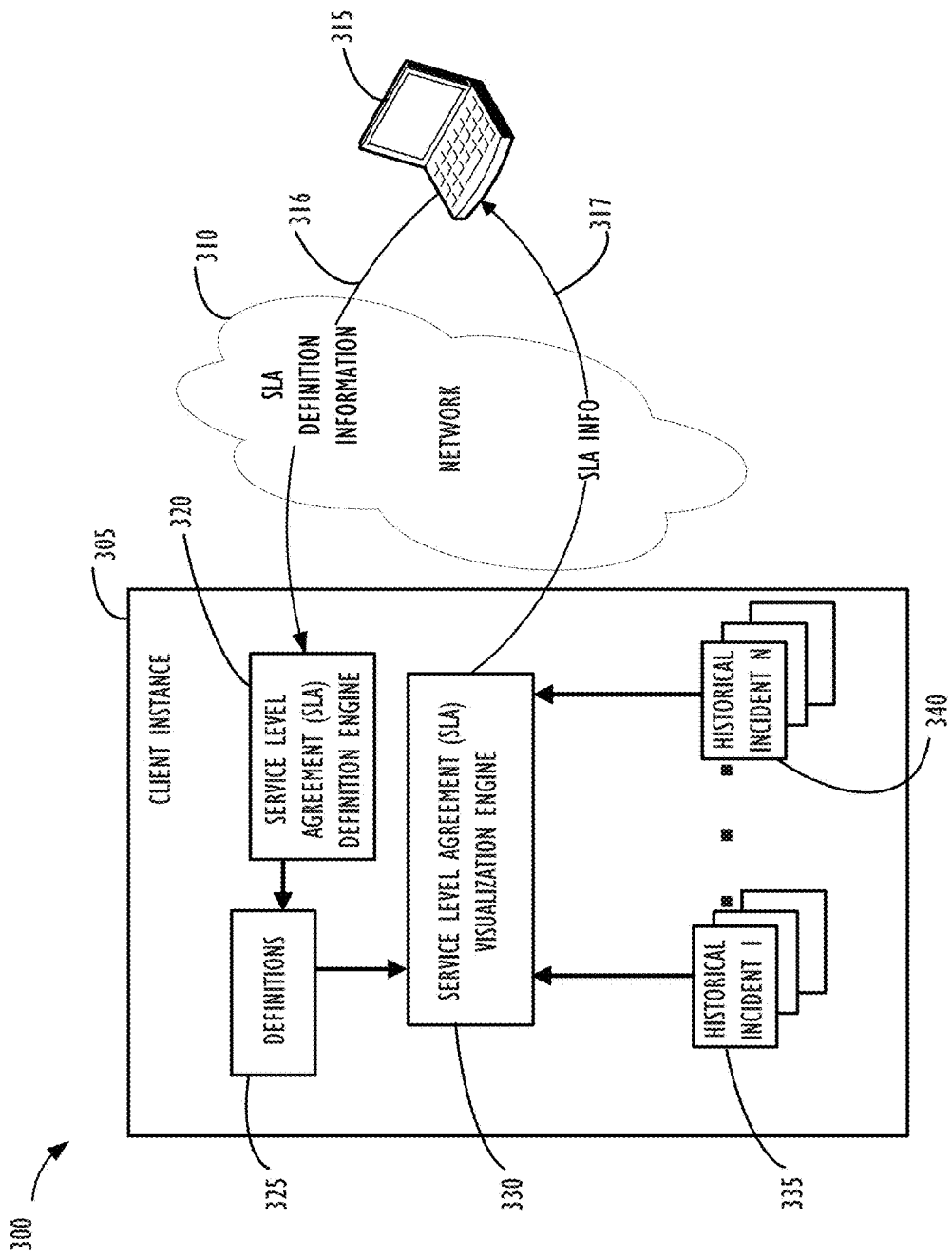
FIG. 3 illustrates a block diagram 300 of components and interactions of those components according to an embodiment of the present disclosure.

FIG. 3 illustrates a block diagram 300 of an embodiment of a network environment and hosted client instance 305 that may be used to support the SLA visualization and validation of proposed SLA definitions according to some disclosed embodiments. As illustrated in FIG. 3, network 310 is a further example of a network such as the Internet or one or more corporate networks such as network 108 of FIG. 1 and network 204 of FIG. 2. In this example, network 310 may represent a single network or a combination of networks that may be configured to transmit SLA definition information 316 from client device 315 to SLA definition engine 320 and return results pertaining to SLA information 317 (e.g., visualization results) from SLA visualization engine 330 to client device 315. Client device 315 may be configured to communicate through network 310 with client instance 305 that may be hosted on a remote server or a remote server instance in a cloud infrastructure as described above. In this example, client device 315 may be configured to execute a web browser interface for SLA definition information 316 to be transmitted to client instance 305 and SLA definition engine 320 within that client instance 305 for processing. SLA definitional information may be stored in a data store (e.g. a Configuration Management Database CMDB) as illustrated by block 325. SLA visualization engine 330 may retrieve SLA definitional information 325 from within client instance 305. Once retrieved, SLA definitional information 325 may be processed by SLA visualization engine 330 using information from one or more historical incident reports (e.g., historical incident 1 335 through historical incident N 340) to prepare a visualization of how this SLA definition would have been measured for conformance against the proposed SLA definition. That is, visualization information provided to client device 315 may be used to validate the proposed SLA definition for the "what-if" scenario of a proposed definition against historically collected metrics for that customer. In this manner, the customer may use their own actual historical information to validate the proposed SLA definition. As explained further below, different visualization methods (e.g., color coding, icon presentation, timeline duration view, etc.) may be an aid for the end-user performing the validation. In this example embodiment, visualization is described as being performed for historical data. However, the visualization techniques describe may be equally applicable to current information and assist end-users in maintaining conformance to SLA definitions in an on-line production setting. Accordingly, disclosed embodiments are not intended to be limited to validation of proposed SLA definitions and the scope of the claims should not be thus limited unless expressly stated in the claim.

Block diagram 300 illustrates an example of a portion of a service provider cloud infrastructure (e.g., cloud resources 110 of FIG. 1) connected via a network 310 such as the Internet to a customer device 315 to provide a user interface (e.g., web browser) to network applications, executing within a client instance 305. Network 310 is a further example of a network such as network 108 of FIG. 1 and network 204 of FIG. 2. Details of these networks are discussed above with reference to each of FIGS. 1 and 2 and are not discussed further here. Service provider cloud infrastructure client instance 305 illustrates cloud resources and server instances similar to those explained with respect to FIG. 2 but illustrated here to show support for an SLA definition, validation, and visualization search within a single client instance 305. Of course, cloud provider infrastructure may be configured to support a plurality of end-user devices such as end-user device 315 concurrently, each in communication with the single client instance 305. Also, cloud provider infrastructures may be configured to support any number of client instances such as client instance 305 concurrently with each of them in communication with one or more end-user devices. As mentioned above, an end-user may interface with client instance 305 using a web browser type application and one example interface is discussed in more detail with respect to the discussion of FIGS. 7-10 below.

Figure 4:
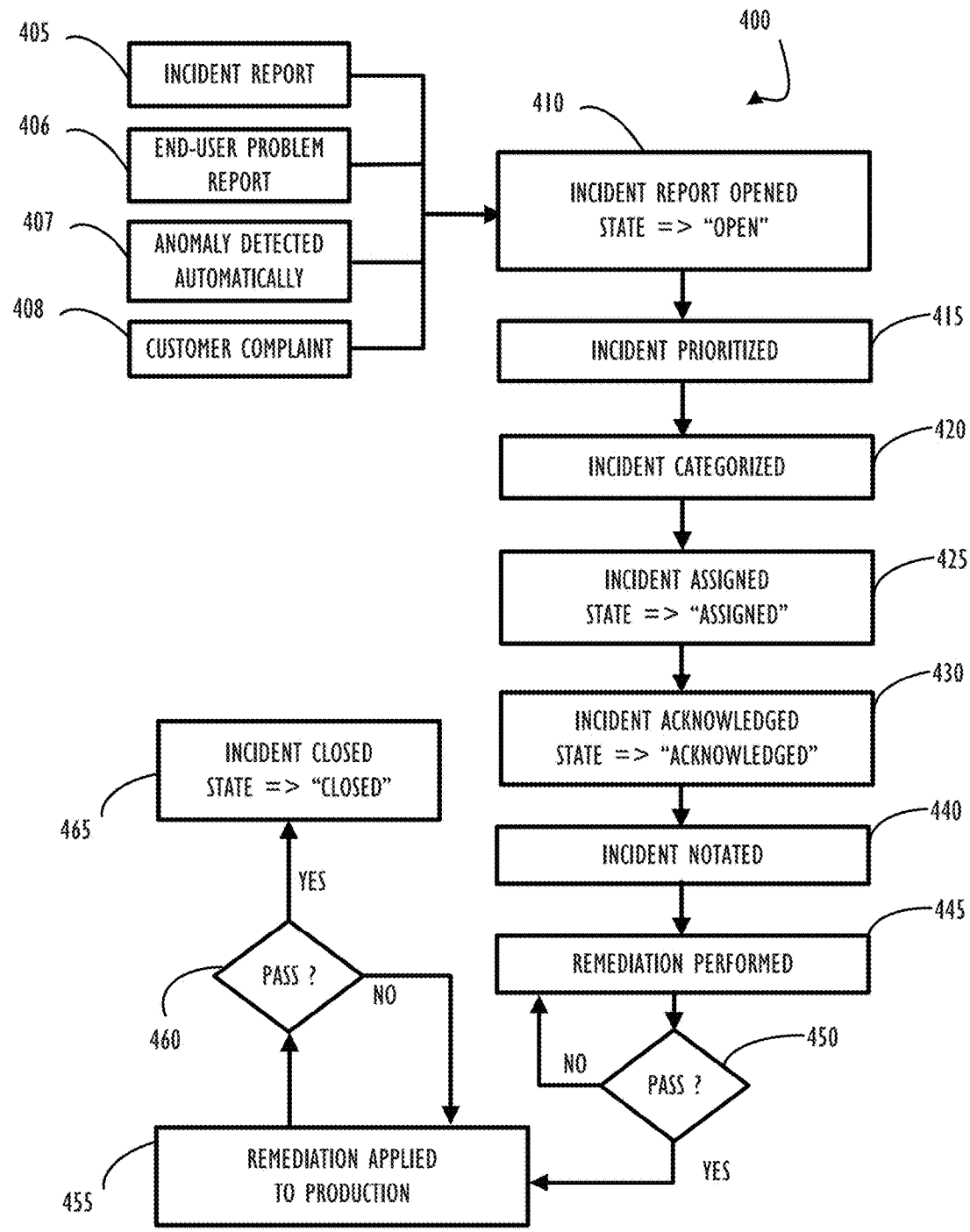
FIG. 4 illustrate a flowchart 400 representing one possible flow for performing methods of processing an incident associated with a service level agreement (SLA) according to one or more disclosed embodiments.

Referring now to FIG. 4, method 400 illustrates one possible flow for an incident SLA tracking system according to an embodiment of this disclosure. Recall, a visualization and validation system in accordance with this disclosure may be used with any type of task that may be associated with an SLA, including change management, security incident, project management, and the like. Incident tracking is used only as an example. Further, for simplicity the number of steps and states in this example of an incident tracking method are kept relatively low. A more complicated implementation with any number of steps and state transitions is contemplated within the scope of this disclosure and will be apparent to one of ordinary skill in the art having the benefit of this disclosure. Blocks 405-408 illustrate example means by which an incident report may be opened. Other possibilities exist for opening an incident. Specifically, block 405 indicates that an incident may be opened by an end-user filling out an incident report. Block 406 indicates that an end-user may report a problem, for example to a help desk. Block 407 indicates that an anomaly could be detected automatically, for example by an application or network monitoring system. Block 408 indicates that an incident report may be opened to reflect a general customer complaint. In the case of a customer complaint, the incident report may not be tied to a specific service at the time of opening because some initial diagnosis may be required to determine what is causing that particular customer issue. Alternatively, the customer complaint could be directed to a specific service that is not functioning properly. Block 410 indicates that the incident report has been opened by one of these means or another means (not shown) and may begin with an initial state of "OPEN." Flow continues to block 415 where the incident report may be prioritized. For example, based on an associated SLA or based on a criticality of the service for which the failure was reported. Clearly, a customer facing e-commerce web site malfunction could be given higher priority than a tape backup system that is not working. At block 420 the incident may be categorized (e.g., assigned to a category such as desktop, server, UNIX server, etc.). Block 425 indicates that the incident may be assigned, for example to an IT system administrator, and the incident's state may be changed to "ASSIGNED." As will be discussed in more detail below, state changes may be an important aspect of tracking a task through the life cycle of that task. States and state transition rules may be defined as part of a task management system setup and may be different for different types of tasks. Block 430 indicates that the incident report has been acknowledged, by a team member in the support staff for example, and the state changed to "ACKNOWLEDGED." Block 440 indicates that the incident report may next be notated by adding information to the incident record describing actions to be taken or other information pertinent to the task of addressing the incident report. Block 445 indicates that a remediation, for example by the system administrator, may be performed in an attempt to correct the underlying problem(s) related to the incident report. At decision 450, it is determined if the remediation is successful. If not successful, flow returns to block 445 where another remediation may be attempted. Alternatively, if yes (test passed) flow continues to block 455 where the validated remediation may be applied to the production system. At decision, 460, it is determined if the remediation is successful in the production system. If no, flow returns to block 455 where the remediation may be checked to ensure it was properly applied to production. Alternatively, if yes (test passed) flow continues to block 465 where the incident report may be closed and the state of the incident report changed to "CLOSED." Each of the steps and information listed above may be tracked and stored in a database, such as a Configuration Management Data Base (CMDB). As will be explained further below, stored information about an incident report life cycle may be useful as historical information to validate a future SLA, for auditing purposes, or for other reasons. Aspects regarding possible display of information associated with the disclosed method 400 will be discussed in more detail below with reference to FIGS. 7-10.

Figure 5:
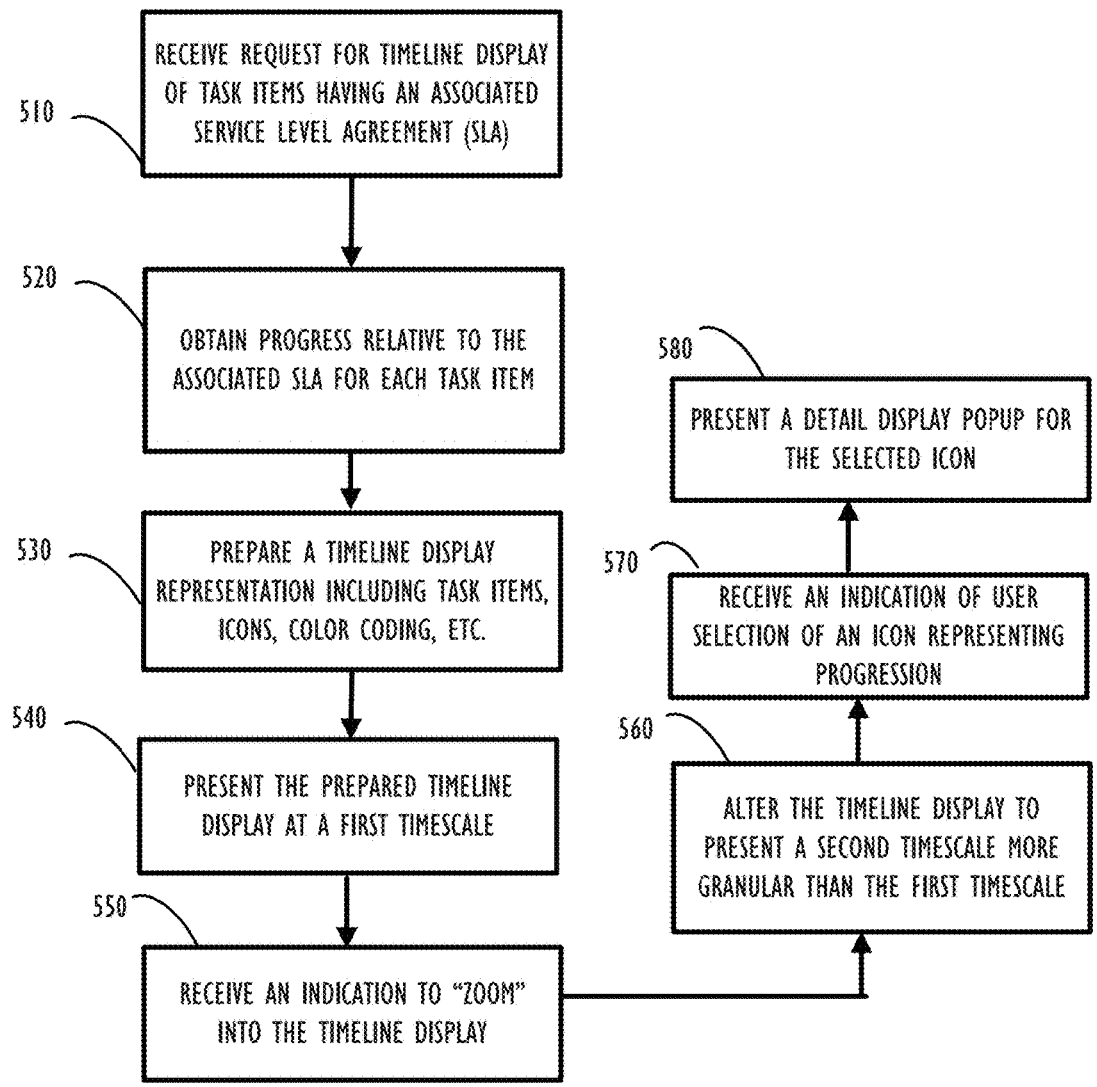
FIG. 5 illustrates a flowchart 500 representing one possible flow for presenting a visualization of a timeline display for information relating to task items (e.g., incident report, or work task) that is associated with an existing SLA or a proposed SLA definition according to one or more disclosed embodiments.

FIG. 5 illustrates a flowchart 500 representing one possible flow for presenting a visualization of a timeline display for information relating to task items (e.g., incident report, or work task) that is associated with an existing SLA or a proposed SLA definition according to one or more disclosed embodiments. Beginning at block 510, a request for a timeline display associated with one or more task items is received. For example, a request from a web browser executing on a client device (e.g., client device 315 of FIG. 3) may be received at a visualization engine (e.g., SLA visualization engine 330 of FIG. 3) executing in a server instance of a cloud service provider (e.g., client instance 305 of FIG. 3). Each of the task items on the timeline display may further be associated with a service level agreement. Block 520 indicates that information related to a stage of progress relative to the associated SLA for each task item may be obtained, for example from a CMDB. Block 530 represents that an SLA visualization engine (e.g., 330) may prepare a timeline display representation for the plurality of task items with each timeline including a set of icons and color coding to indicate a progression through a workflow for the corresponding task item. The color coding may be used to represent compliance with time limits of the associated SLA and the icons may be used to represent state transitions or other instantaneous activity associated with progression through the workflow. Block 540 indicates that the timeline display may be presented on the client device (e.g., 315) at a first timescale or "zoom level." As used here, the "zoom level" refers to the amount of time represented as a horizontal scale for example (see FIGS. 7-10). A higher zoom level means that the amount of time shown for a horizontal segment (e.g., a minute for a 1 inch horizontal segment) on the display device is less than the amount of time shown for the same amount of horizontal space at a lower zoom level (e.g., an hour for a 1 inch horizontal segment). Of course, the same representation could be presented in other orientations than horizontal without departing from the scope of this disclosure (e.g., time running vertically). Block 550 indicates that a request to "zoom in" on the timeline display is received. In response to that request, block 560 indicates that the timeline display is regenerated (e.g., re-displayed or re-rendered) such that the prepared timeline display is presented at a second timescale more granular than the first timescale. This new presentation at the higher zoom level may provide an end-user with further insight into closely occurring events in the timeline relative to each other and the associated SLA. At block 570 an indication that an end-user has selected an icon on the timeline display (e.g., end-user clicked on state change icon). Block 580 indicates that in response to the selection, a detail popup (see FIG. 10) pertaining to the SLA condition causing the state change associated with the selected icon may be presented. As explained in more detail below with reference to FIG. 10, the popup may include further navigation selection buttons to progress in a step wise fashion across adjacent state changes within the timeline display.

Figure 6:
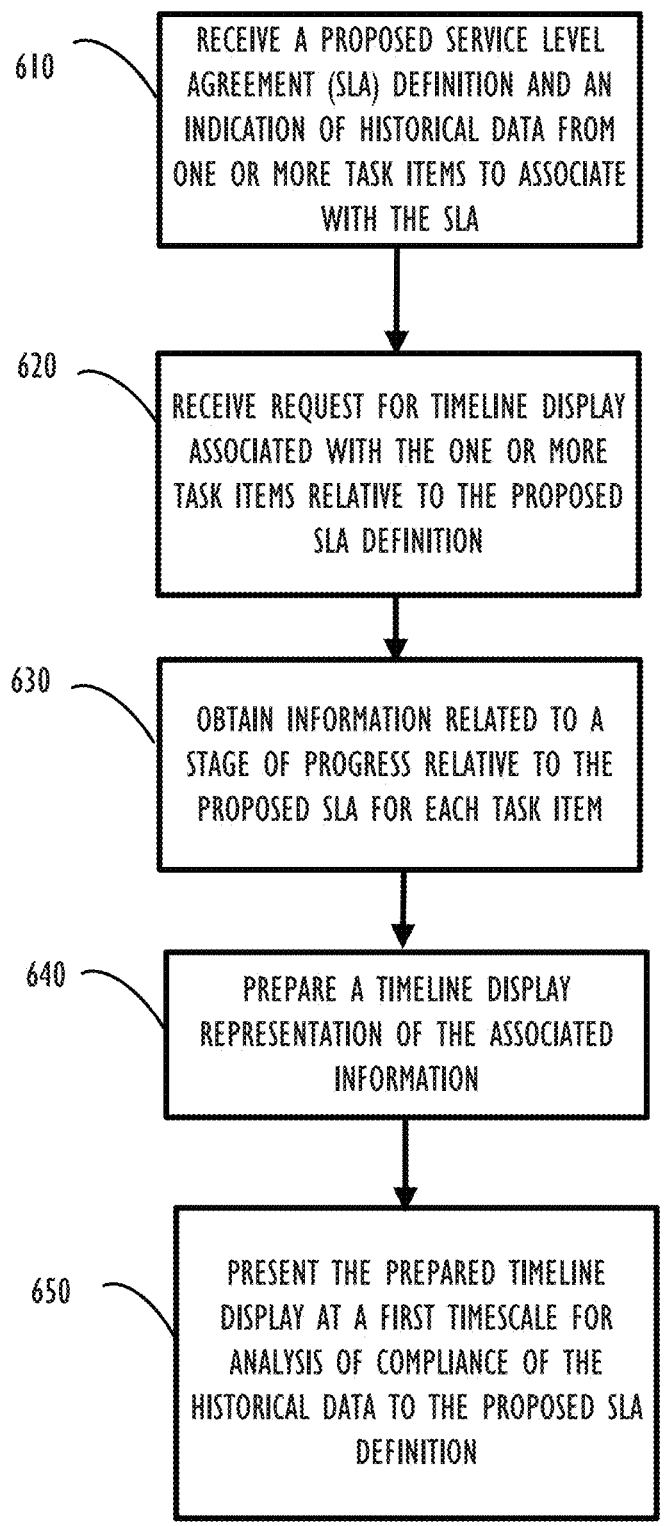
FIG. 6 illustrates a flowchart 600 representing one possible flow for presenting a visualization of a timeline display for information relating to task items (e.g., incident report, or work task) that is associated with a proposed SLA definition and processing it with respect to historical information according to one or more disclosed embodiments.

FIG. 6 illustrates a flowchart 600 representing one possible flow for presenting a visualization of a timeline display for information relating to task items (e.g., incident report, or work task) that is associated with a proposed SLA definition and processing it with respect to historical information according to one or more disclosed embodiments. Beginning at block 610, a request may be received indicating a proposed SLA definition and an indication of historical data (e.g., a historical workflow task) to be associated with the proposed SLA. Block 620 indicates that a request for a timeline display is received to provide a visual representation of the association made at block 610. Block 630 indicates that information related to a stage of progress relative to the proposed SLA and the associated historical data is obtained. For example, a historical incident report and its associated life cycle information may be retrieved from a CMDB. Block 640 indicates that the timeline display is prepared, for example at timeline display with icons and color coding as explained above for FIG. 5. Block 650 indicates that the prepared timeline display is presented at a first timescale. For example, at a first timescale for analysis, by an end-user, of compliance of the historical data with the proposed SLA definition. This presentation may be useful for the end-user to validate that the proposed SLA definition is reasonable with respect to historical performance of system administrators in addressing a set of incident reports for example.

Figure 7:
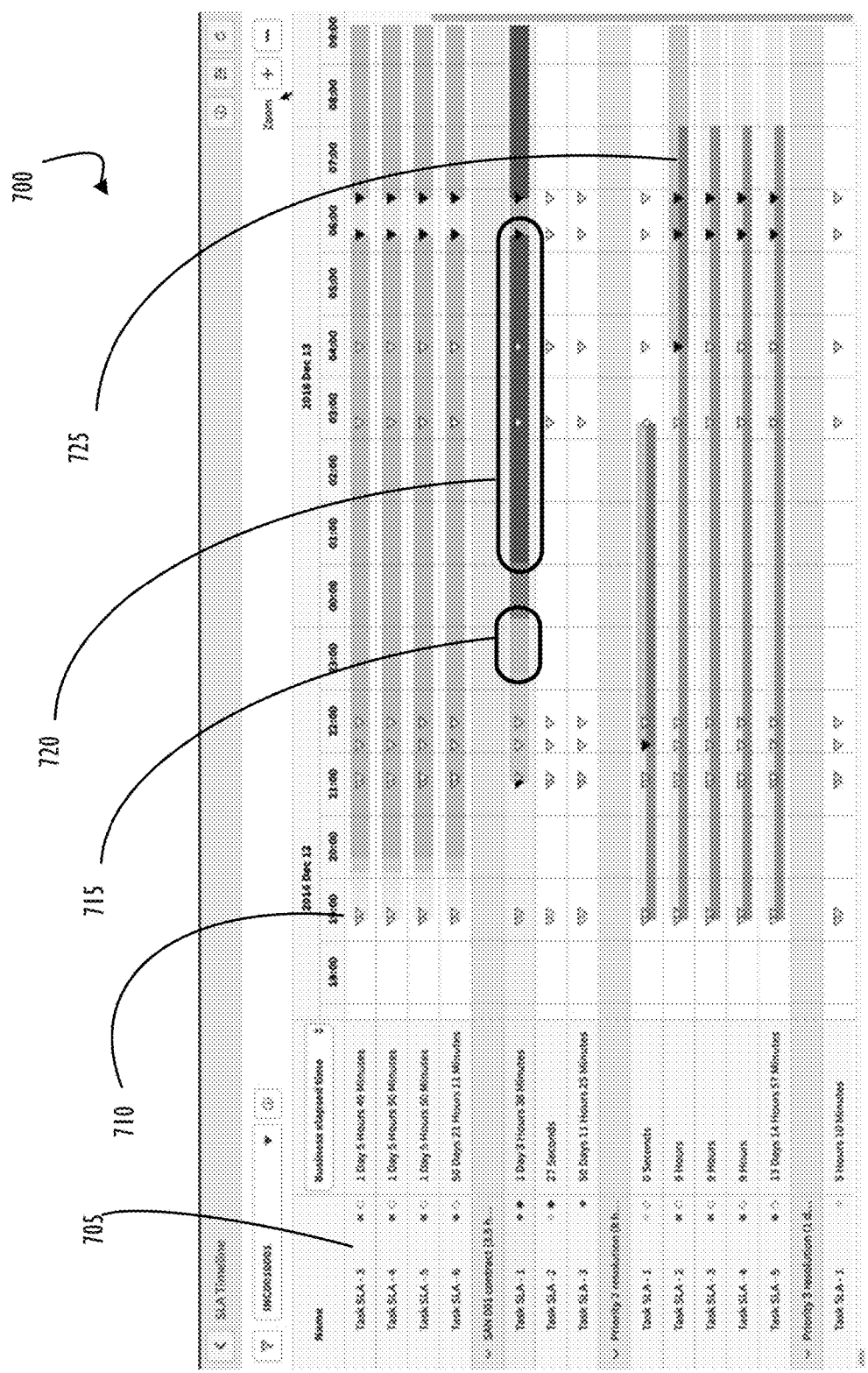
FIG. 7 illustrates a screen shot 700 of a plurality of tasks, each associated with an SLA and providing a visualization with indications of conformance to the associated SLA, the visualization further including indications of state changes with respect to the SLA, according to one or more disclosed embodiments.
Figure 8:
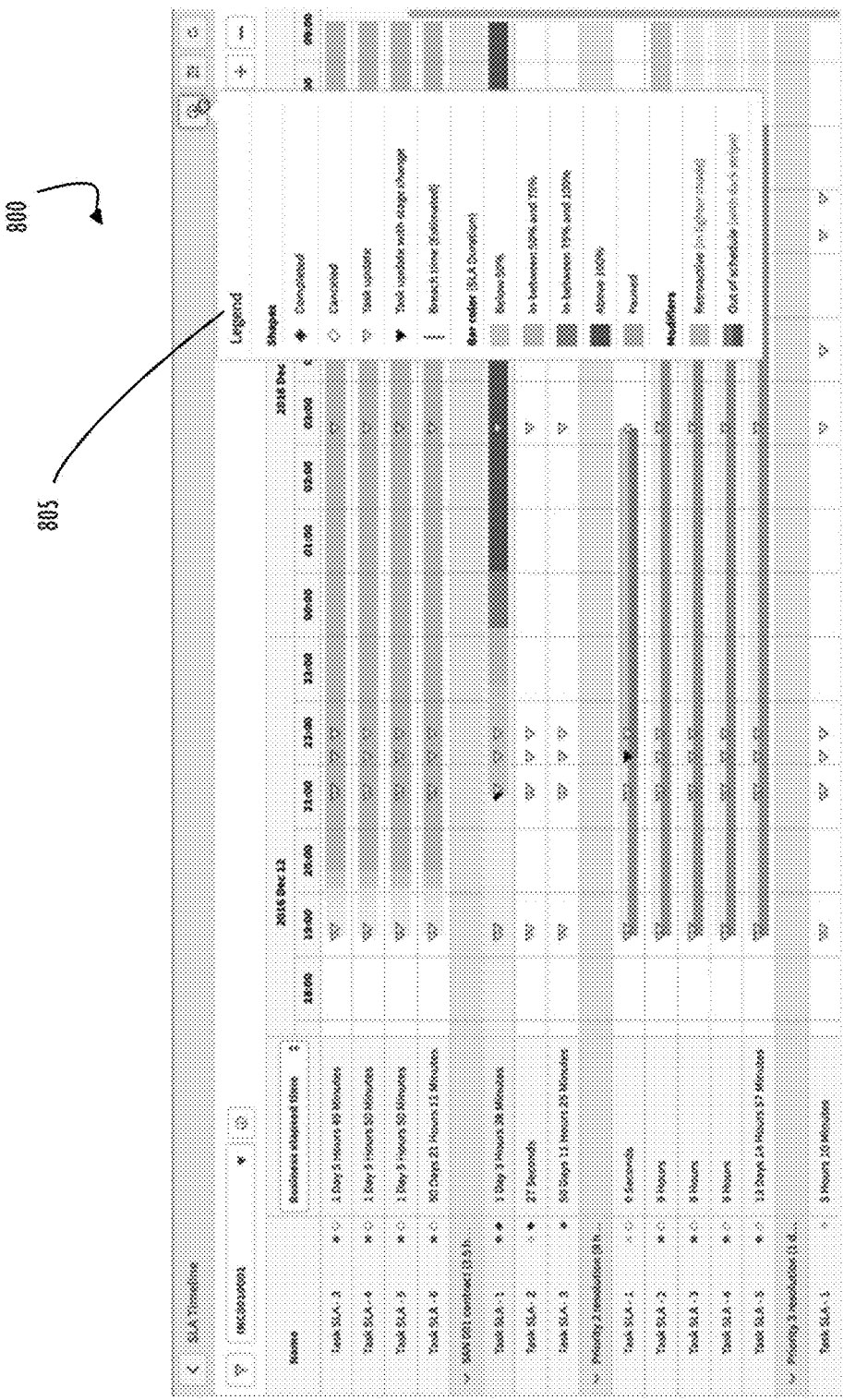
FIG. 8 illustrates a screen shot 800 including one possible legend 805 explaining elements and icons shown in screen shot 700 according to one or more disclosed embodiments.
Figure 9:
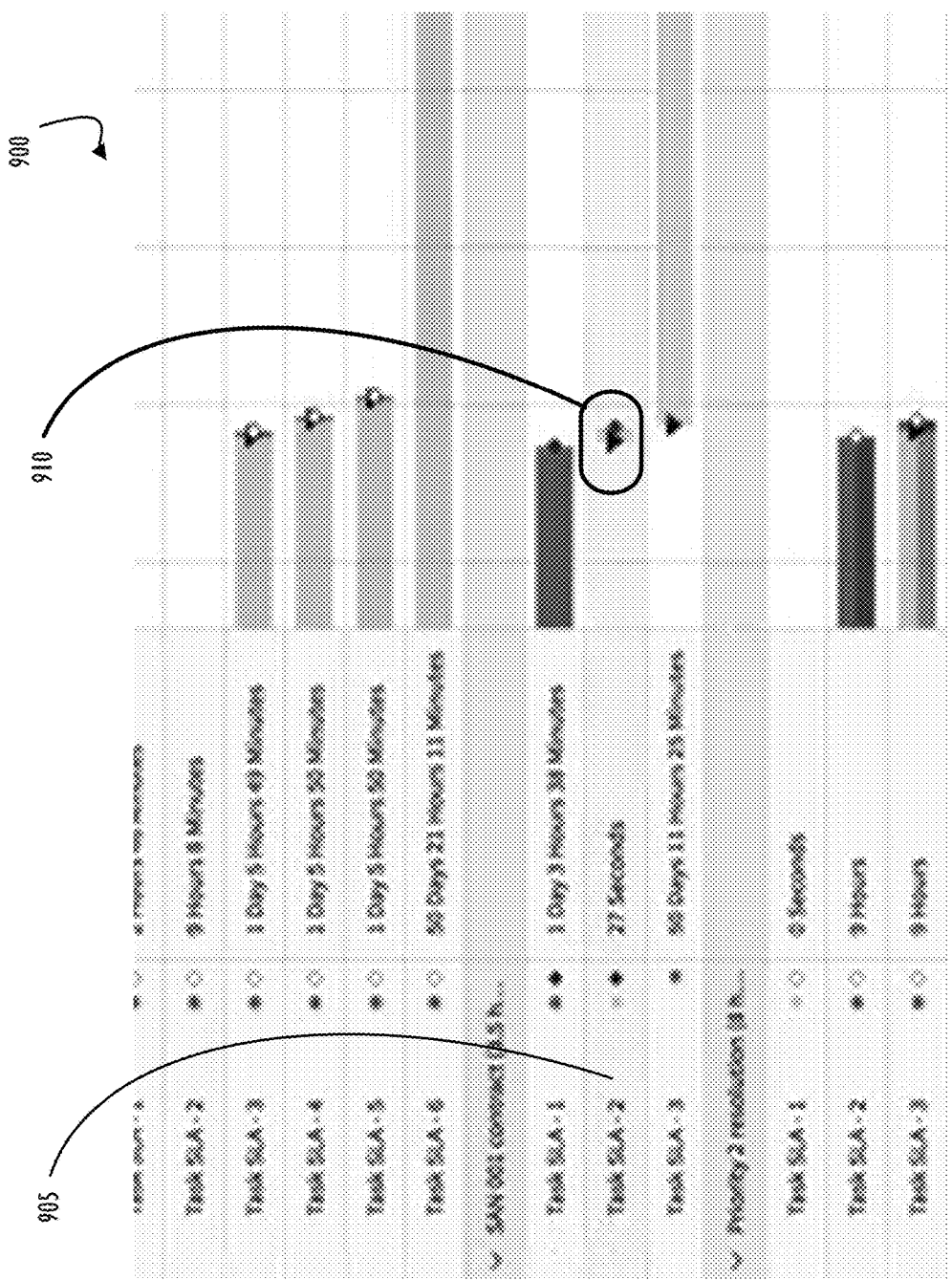
FIG. 9 illustrates a zoomed portion 900 of screen shot 700 to illustrate a grouping of closely occurring events 910 within a timeline display according to one or more disclosed embodiments.

Referring now to FIGS. 7-9, FIG. 7 illustrates a screen shot 700 of a plurality of tasks, each associated with an SLA, and providing a visualization with indications of conformance to the associated SLA, the visualization further including indications of state changes with respect to the SLA, according to one or more disclosed embodiments. Element 705 represents a task item. Element 710 represent an icon indicating a state change or other discrete event associated with the task item. Element 715 represents a color coded segment of the horizontal timeline. Color coding may be used to represent an elapsed time and compliance with SLA requirements. For example, a first color (e.g., green) may be used to represent that the amount of time used is less than 50% of the allowable time, a second color (e.g., yellow) may be used to represent that the amount of time used is between 50% and 75%, a third color (e.g., orange) may be used to represent the amount of time is between 75% and 100%, and a fourth color (e.g., red as indicated by element 720) may be used to represent that the SLA is out of compliance and more than 100% of the allowable time has elapsed. Additionally, a modifier as illustrated by element 725 may be presented by darkening a lower half of the timeline bar to indicate areas related to a scheduling aspect of the SLA. For example, some SLAs may only be active during regular work hours such that they are considered "out of schedule" during non-working hours, while others may be "in-schedule" twenty four hours a day every day. FIG. 8 illustrates a screen shot 800 including one possible legend 805 explaining elements and icons shown in screen shot 700 according to one or more disclosed embodiments. FIG. 9 illustrates a zoomed portion 900 of screen shot 700 to illustrate a grouping of closely occurring events 910 for task SLA-2 element 905 within a timeline display according to one or more disclosed embodiments.

Figure 10:
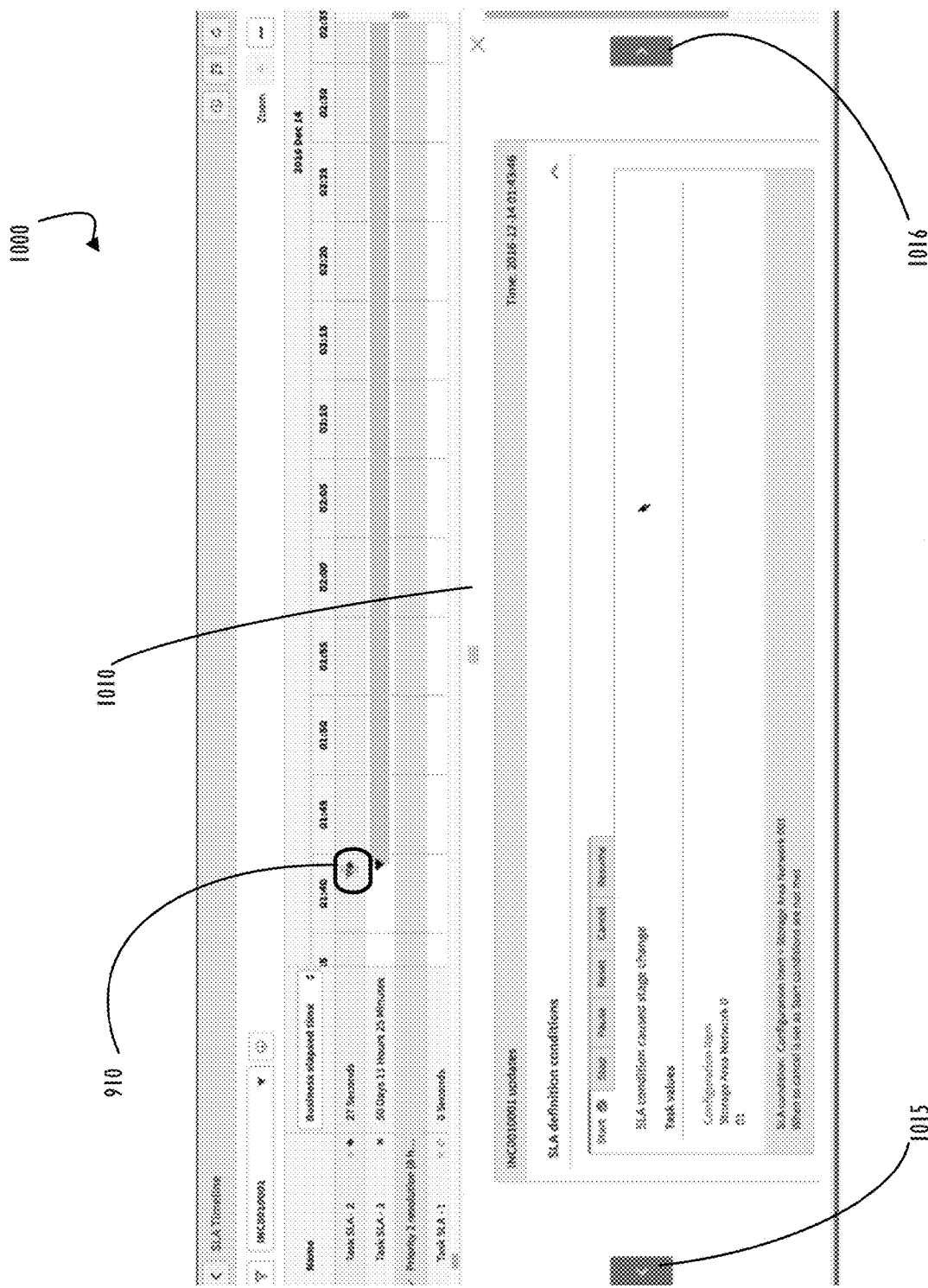
FIG. 10 illustrates a screen shot 1000 including a popup dialog 1010 designed to convey information and allow detailed navigation of closely occurring events 910 within a timeline display according to one or more disclosed embodiments.

FIG. 10 illustrates a screen shot 1000 including a popup dialog 1010 designed to convey information and allow detailed navigation of closely occurring events 910 within a timeline display according to one or more disclosed embodiments. Selection buttons 1015 and 1016 may be used to step backward (1015) or step forward (1016) through SLA conditions causing a state change for example. As explained above, this method of presentation may be useful to obtain information about closely occurring events. Events that are caused by automated systems may occur at a very close time proximity to one another and thus may be more easily viewed using the information provided in popup dialog 1010.

Figure 11:
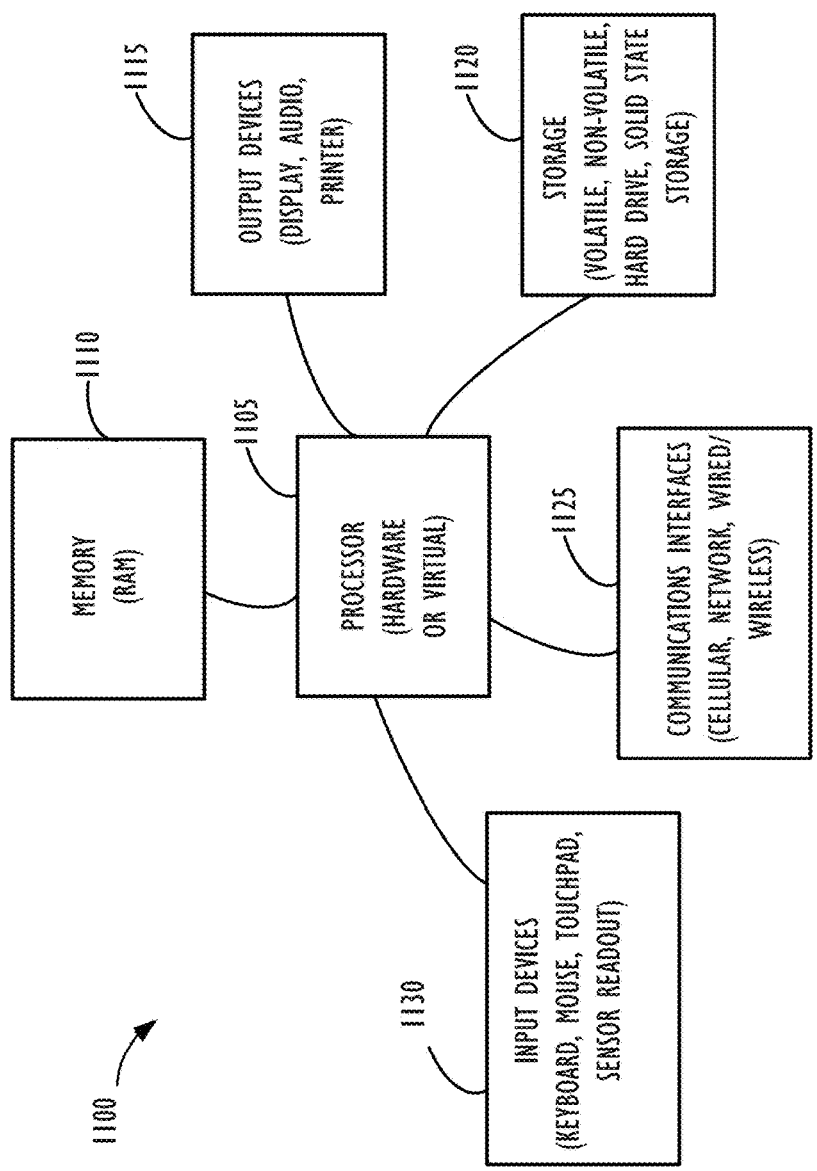
FIG. 11 illustrates a high-level block diagram 1100 of a processing device (computing system) that may be used to implement one or more disclosed embodiments.

FIG. 11 illustrates a high-level block diagram 1100 of a processing device (computing system) that may be used to implement one or more disclosed embodiments (e.g., service provider cloud infrastructure 110, client devices 104A-104E, server instances 112, data centers 206A-B, etc.). For example, computing device 1100 illustrated in FIG. 11 could represent a client device or a physical server device and include either hardware or virtual processor(s) depending on the level of abstraction of the computing device. In some instances (without abstraction) computing device 1100 and its elements as shown in FIG. 11 each relate to physical hardware and in some instances one, more, or all of the elements could be implemented using emulators or virtual machines as levels of abstraction. In any case, no matter how many levels of abstraction away from the physical hardware, computing device 1100 at its lowest level may be implemented on physical hardware. As also shown in FIG. 11, computing device 1100 may include one or more input devices 1130, such as a keyboard, mouse, touchpad, or sensor readout (e.g., biometric scanner) and one or more output devices 1115, such as displays, speakers for audio, or printers. Some devices may be configured as input/output devices also (e.g., a network interface or touchscreen display). Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), Wi-Fi, cellular, and/or other communication methods.

As illustrated in FIG. 11, processing device 1100 includes a processing element such as processor 1105 that contains one or more hardware processors, where each hardware processor may have a single or multiple processor cores. In one embodiment, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 11, the processing elements that make up processor 1105 may also include one or more other types of hardware processing components, such as graphics processing units (GPU), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more storage devices 1120 that comprise a non-volatile storage device and/or volatile memory. Volatile memory, such as random access memory (RAM), can be any suitable non-permanent storage device. The non-volatile storage devices 1120 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 1105. In one embodiment, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device 1100.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 1100 may comprise other components well known in the art, such as sensors, powers sources, and/or analog-to-digital converters, not explicitly shown in FIG. 11.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A cloud-based computer system, comprising:
    a memory partition;
    a network interface communicatively coupled to one or more processing units and the memory partition, wherein the memory partition comprises computer instructions that when executed by the one or more processing units cause the cloud-based computer system to:
        provide a hosted client instance communicatively coupled, via the network interface, with a remote client device;
        receive a request from the remote client device for a timeline display of a plurality of task items, each task item having an associated service level agreement (SLA);
        obtain information related to a stage of progress for each task item relative to the associated SLA;
        prepare the timeline display for the plurality of task items, each task item in the timeline display having a set of icons indicating a progression through a workflow of a corresponding task item, each task item presented as a timeline in the timeline display, and each timeline having a color coding indicating a state of compliance with the associated SLA for a duration of time within the timeline associated with the corresponding task item; and
        send information regarding the timeline display to the remote client device.

2. The cloud-based computer system of claim 1, wherein the computer instructions further cause the cloud-based computer system to:
    receive an indication to zoom into the timeline display; and
    alter the timeline display to present an adjusted representation of the timeline display, the adjusted representation at an incrementally finer time granularity as a response to the received indication to zoom.

3. The cloud-based computer system of claim 1, wherein the computer instructions further cause the cloud-based computer system to:
    receive an indication to zoom out of the timeline display; and
    alter the timeline display to present an adjusted representation of the timeline display, the adjusted representation at an incrementally denser time granularity as a response to the received indication to zoom.

4. The cloud-based computer system of claim 1, wherein the information related to a stage of progress for each task item relative to the associated SLA comprises historical information obtained from a data store.

5. The cloud-based computer system of claim 4, wherein the data store comprises a configuration management data base (CMDB).

6. The cloud-based computer system of claim 4, wherein the associated SLA comprises a proposed SLA definition.

7. The cloud-based computer system of claim 1, further comprising computer instructions to cause the cloud-based computer system to:
    receive an indication of selection of an icon; and
    send information to the remote client device sufficient to allow the remote client device to present a pop up dialog providing further information associated with the icon.

8. The cloud-based computer system of claim 1, wherein the set of icons represent state changes associated with the progression through the workflow of the corresponding task item.

9. The cloud-based computer system of claim 8, wherein the state changes are selected from the group consisting of OPEN, ASSIGNED, CANCELLED, COMPLETED, TASK UPDATE, and TASK UPDATE WITH STATE CHANGE.

10. The cloud-based computer system of claim 1, further comprising computer instructions to cause the cloud-based computer system to provide a modifier to overlay on at least a portion of the color coding of at least one timeline, the modifier to indicate that the SLA is out of schedule.

11. The cloud-based computer system of claim 1, wherein the plurality of task items are selected from the group consisting of: an incident report, a help desk trouble ticket, a security incident, and a change request.

12. A service level agreement (SLA) validation method, comprising:
    receiving an indication of historical data associated with a plurality of task items and progression of the plurality of task items through a workflow;
    receiving an indication of a proposed SLA definition to apply to the historical data;

receiving a request for a timeline display associated with the plurality of task items relative to the proposed SLA definition;

determining, using the historical data, information related to a stage of progress through the workflow relative to the proposed SLA definition for each of the plurality of task items; and preparing the timeline display for the plurality of task items, each task item presented as a timeline in the timeline display, the timeline having a set of icons indicating a progression through the workflow of a corresponding task item, the progression through the workflow derived at least in part from the historical data, and the timeline having a color coding indicating a state of compliance with the proposed SLA for a duration of time within the timeline.

13. The method of claim 12, further comprising:

receiving an indication of selection of an icon on the timeline display; and preparing a pop up dialog providing further information about the icon.

14. The method of claim 12, wherein the set of icons represent state changes associated with the progression through the workflow of the corresponding task item.

15. The method of claim 14, wherein the state changes are selected from the group consisting of OPEN, ASSIGNED, CANCELLED, COMPLETED, TASK UPDATE, and TASK UPDATE WITH STATE CHANGE.

16. The method of claim 12, wherein the plurality of task items are selected from the group consisting of: an incident report, a help desk trouble ticket, a security incident, and a change request.

* * * * *